(12) United States Patent
Sousa

(10) Patent No.: US 11,759,083 B2
(45) Date of Patent: Sep. 19, 2023

(54) GRILL CLEANING PAD

(71) Applicant: Jordan Kahn Company, Newton, MA (US)

(72) Inventor: Mark Sousa, Hope, RI (US)

(*) Notice: Subject to any disclaimer, the term of this patent is extended or adjusted under 35 U.S.C. 154(b) by 141 days.

(21) Appl. No.: 17/466,937

(22) Filed: Sep. 3, 2021

(65) Prior Publication Data

US 2023/0069993 A1    Mar. 9, 2023

(51) Int. Cl.
| A47L 13/03 | (2006.01) |
| A47J 37/07 | (2006.01) |
| A47L 13/022 | (2006.01) |
| A47L 13/34 | (2006.01) |

(52) U.S. Cl.
CPC ........... *A47L 13/03* (2013.01); *A47J 37/0786* (2013.01); *A47L 13/022* (2013.01); *A47L 13/34* (2013.01)

(58) Field of Classification Search
CPC ...... A47L 13/34; A47L 13/022; A47J 37/0786
USPC ...................................................... 15/104.93
See application file for complete search history.

(56) References Cited

U.S. PATENT DOCUMENTS

| 2,879,532 | A | * | 3/1959 | Szabo | A47L 13/22 |
| | | | | | 401/24 |
| 6,216,306 | B1 | * | 4/2001 | Esterson | A46B 7/04 |
| | | | | | D4/118 |
| 6,871,377 | B2 | * | 3/2005 | Veltrop | A47L 13/34 |
| | | | | | 30/169 |
| 6,962,456 | B2 | * | 11/2005 | Larsen | A46B 11/0062 |
| | | | | | 401/282 |
| D530,098 | S | * | 10/2006 | Neal | D4/118 |
| D547,553 | S | * | 7/2007 | Borovicka | D4/138 |
| D557,901 | S | * | 12/2007 | Zemel | D4/118 |
| D567,511 | S | * | 4/2008 | Borovicka | D4/118 |
| D593,755 | S | * | 6/2009 | Mendez | D4/118 |
| D597,740 | S | * | 8/2009 | Borovicka | D4/138 |
| 7,632,033 | B2 | * | 12/2009 | Wales | A47J 37/0786 |
| | | | | | 401/39 |
| D609,015 | S | * | 2/2010 | Borovicka | D4/138 |
| 8,209,812 | B1 | * | 7/2012 | Dondurur | A47L 13/34 |
| | | | | | 15/160 |
| D681,345 | S | * | 5/2013 | Wales | D4/138 |
| D690,116 | S | * | 9/2013 | Zemel | D4/118 |
| 8,671,500 | B2 | * | 3/2014 | Carlson | A47L 13/34 |
| | | | | | 15/228 |
| D789,095 | S | * | 6/2017 | Wales | D4/131 |
| D814,727 | S | * | 4/2018 | Wehrlie | D32/40 |
| D845,639 | S | * | 4/2019 | Hu | D4/118 |
| 2010/0056413 | A1 | * | 3/2010 | Harry, Jr. | A47L 17/00 |
| | | | | | 15/210.1 |
| 2013/0042879 | A1 | * | 2/2013 | Orr | D21H 27/30 |
| | | | | | 15/209.1 |
| 2019/0053668 | A1 | * | 2/2019 | Norris | A47L 17/08 |

* cited by examiner

*Primary Examiner* — Tom Rodgers
(74) *Attorney, Agent, or Firm* — Frank Marino

(57) ABSTRACT

A utensil for cleaning a cooking surface has cleaning head affixed to a distal end of an elongate handle. The head has a base and a porous cover. Submerging the head in a liquid enables the liquid to flow through the porous cover and perforations in the base into chambers within the base. Applying the head having the liquid-filled chambers against the cooking surface enables the liquid to flow from the chambers and through the perforations and continuously dampen the porous cover.

20 Claims, 4 Drawing Sheets

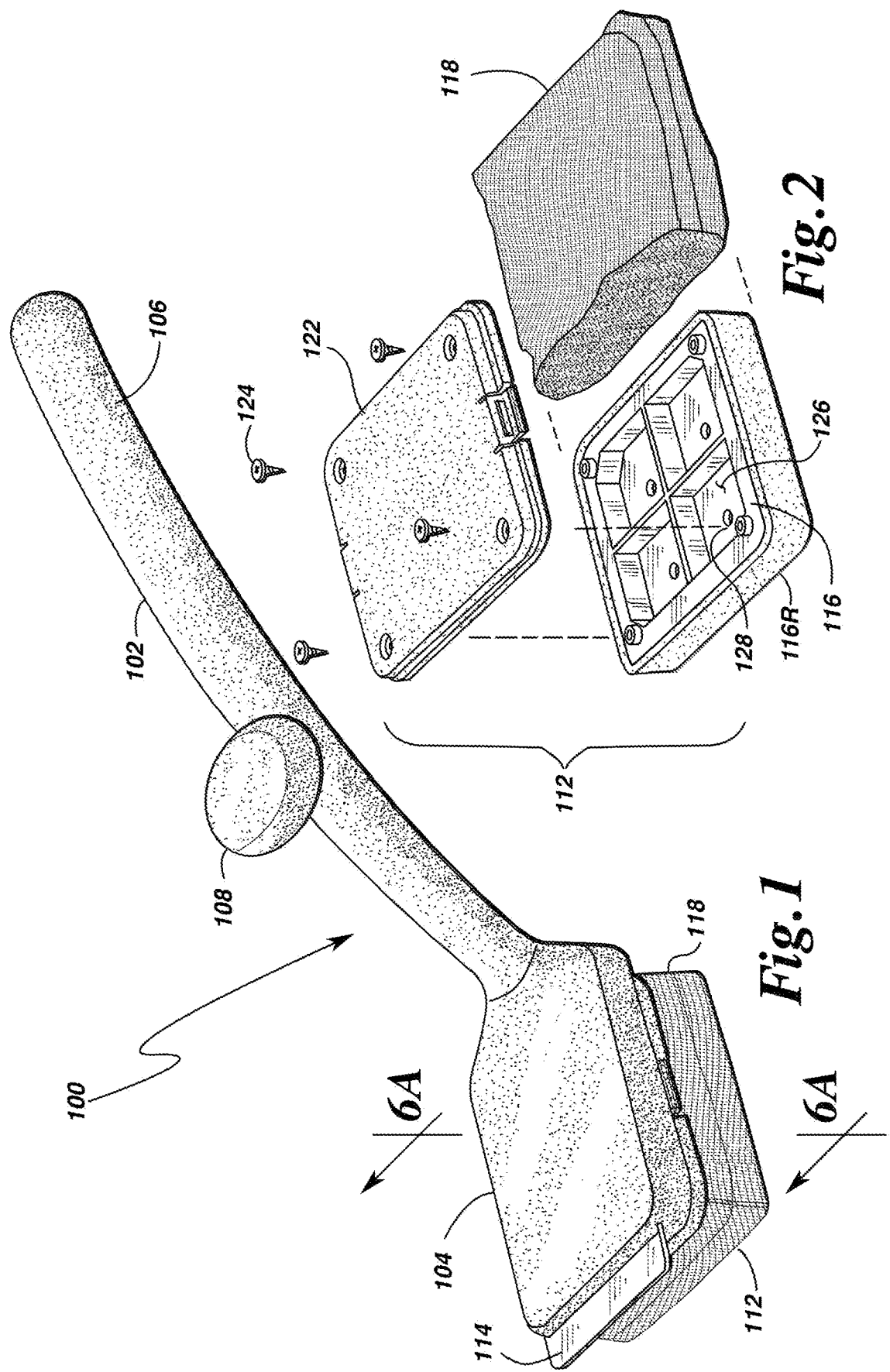

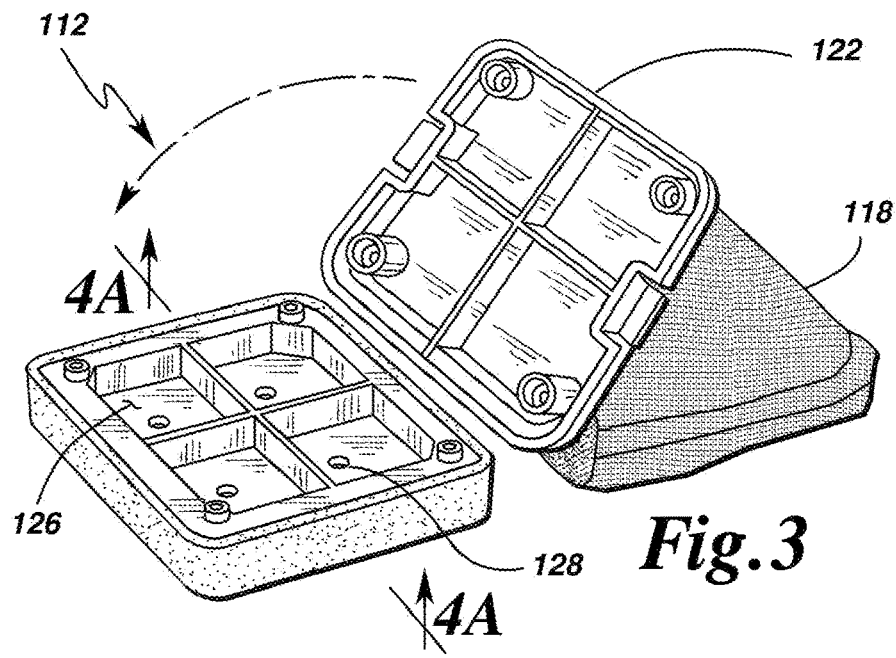
Fig.3
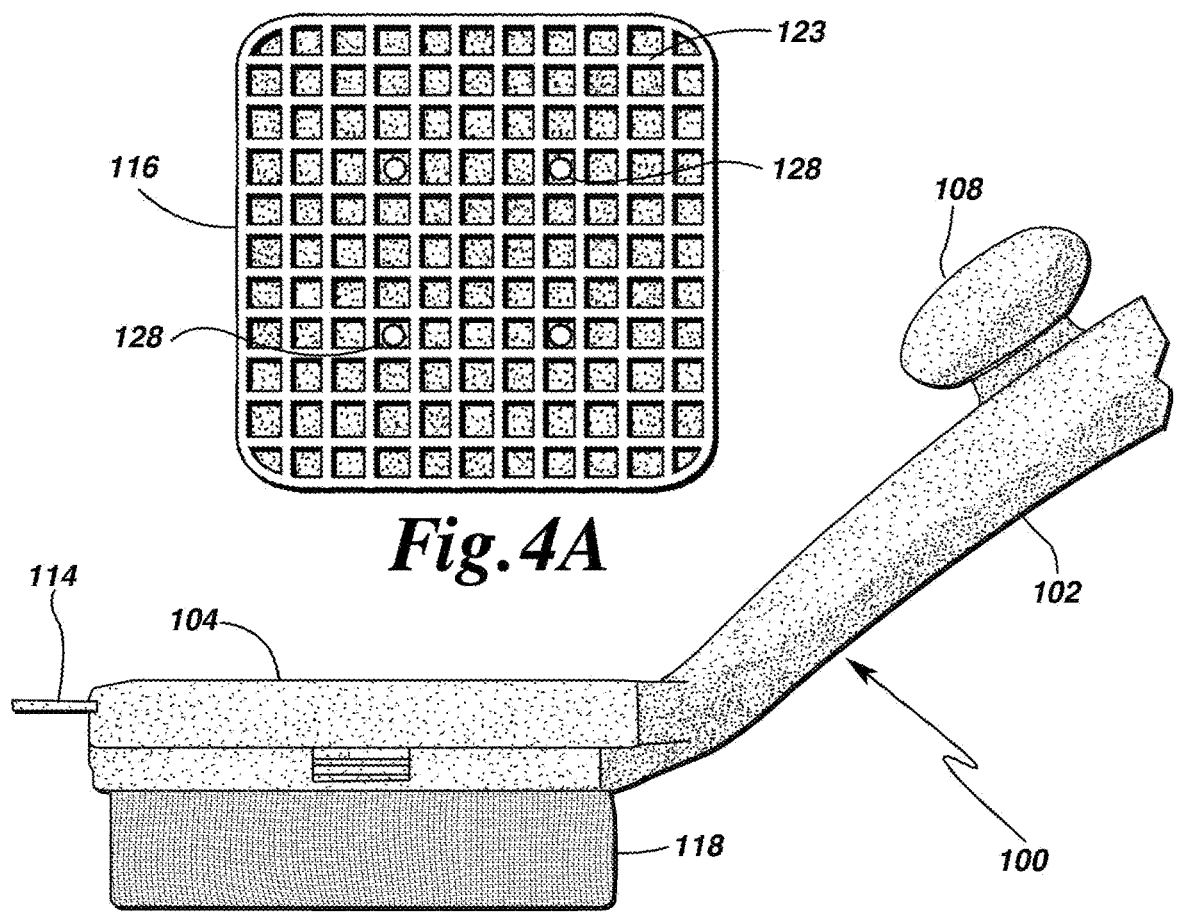
Fig.4A
Fig.5

GRILL CLEANING PAD

FIELD OF THE INVENTION

The present invention is related to outdoor cooking and to accessories therefore. More specifically, this invention is related to a cleaning accessory for use on a barbeque grill or griddle surface.

BACKGROUND

Grill and griddle cleaning brushes, pads, and scrapers are well known and typically include a heat-resistant scrubbing interface to scrape residue from the cooking surface. Such residue is easiest to remove when the cooking surface is very hot, such as immediately before or after cooking, but it can become baked on and is still very difficult to remove, so some cleaning brushes of the prior art have incorporated water reservoirs and means to spray water ahead of the scraping with the goal of moistening and softening the baked-on residue to ease its removal. Such devices have proven ineffective, mostly because the hot cooking surface vaporizes the water instantly . . . before it can have any effect on the residue. Additionally, such water-spraying brushes are ineffective at fully cleaning the cooking surface because only thin lines in the residue are contacted by the brush's bristles. And the water must be applied over and over ahead of each scraping stroke. And while brushes might eventually and laboriously remove the baked-on residue, they leave behind a black film of unknown ingredients to be added to the surface of the next food cooked.

There is a need, and such is an object of the invention, to provide a grill or griddle cleaning tool which effectively softens reside on hot cooking surfaces by moistening and softening the residue exactly at and during the point of scraping.

There is a need, and such is an object of the invention, to provide a grill or griddle cleaning tool which moistens and softens the residue continuously with requiring reapplication of moisture between each stroke.

There is a need, and such is another object of the invention, to provide such a grill or griddle cleaning tool which includes means to wipe the cooking surface clean as it is scrubbing it.

There is a need, and such is another object of the invention, to provide such means which are easily and inexpensively replaceable without replacing the major portion of the tool.

Further needs and objects exist which are addressed by the present invention, as may become apparent upon review of the included disclosure of exemplary embodiments thereof.

SUMMARY OF THE INVENTION

The invention may be embodied in or practiced using a utensil for cleaning a cooking surface having cleaning head affixed to a distal end of an elongate handle, wherein the head has a base and a porous cover, wherein the base has a chamber, wherein the chamber has a perforation through or adjacent a bottom thereof under which is disposed a layer of the porous cover, so that the chamber is in fluid communication with the layer, wherein submerging the head in a liquid enables the liquid to flow through the layer and the perforation and into the chamber; and wherein applying the head having the liquid-filled chamber against the cooking surface enables the liquid to flow from the chamber and through the perforation and continuously dampen the layer.

The base may be made of a heat-resistant rubbery material. The porous cover may be made of Kevlar. The elongate handle may be made of a rigid and heat-resistant material.

The head may be removable from the handle for replacement or cleaning. The head may be machine washable. The handle may have an elongate grasp at its proximal end and a knob midway between its proximal and distal ends.

The head may have a lid having means to temporarily affix the head to the distal end of the handle. The means to temporarily affix the head to the distal end of the handle may allow removal and replacement of the head without the use of tools. The utensil may have a metal scraping blade protruding from the distal end.

The base may include one from the group including integrally-formed rubber ribs and integrally formed rubber fingers, disposed against the layer of the porous cover and adapted to enable conformity of the layer with the cooking surface.

The base may have a plurality of chambers.

Further features and aspects of the invention are disclosed with more specificity in the Detailed Description and accompanying drawings of an exemplary embodiment provided herein.

BRIEF DESCRIPTION OF THE DRAWINGS

Many aspects of the invention can be better understood with reference to the included Drawings showing an exemplary embodiment for practicing the invention which corresponds to the accompanying Detailed Description. The components in the Drawings are not necessarily to scale, emphasis instead being placed upon clearly illustrating the principles of the invention. Moreover, like reference numerals in the Drawings designate corresponding parts throughout the several views.

FIG. 1 is a perspective view of an exemplary grill or griddle cleaning tool according to or useful in practicing the invention;

FIG. 2 is an exploded view of the cleaning head of the tool of FIG. 1;

FIG. 3 is another exploded view of the cleaning head of the tool of FIG. 1;

FIG. 4A is a bottom view of the base of the cleaning head of the tool of FIG. 1 taken at line 4-4 of FIG. 3;

FIG. 5 is a partial side view of the tool of FIG. 1;

DETAILED DESCRIPTION OF AN EXEMPLARY EMBODIMENT

Figure 4B:
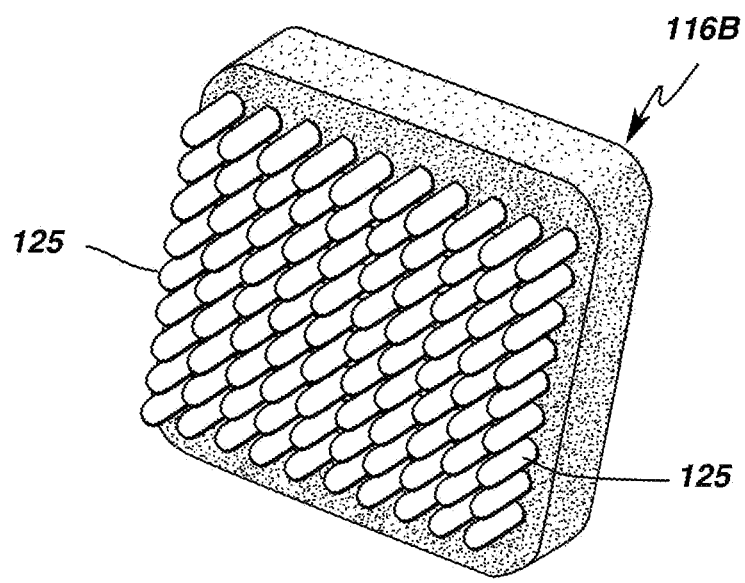
FIG. 4B is a perspective bottom view of an alternate base of the cleaning head of the tool of FIG. 1.

An exemplary embodiment of a grill or griddle cleaning tool 100 is shown in FIGS. 1 through 4A and 5 through 7, which includes handle portion 102 and cleaning head portion 104. The handle portion includes a generally-cylindrical elongate grasp 106 for engaging the handle with one hand at its proximal end, a knob 108 for engaging the handle with the other hand midway along its top surface, and a cleaning head cartridge 112 adjacent its distal end. A metal scraping blade 114 protrudes from the distal end.

The cleaning head cartridge includes a base 116/116R, a pouch 118 and a lid 122. The lid includes flexible latches which snap into the cartridge receiver to hold it in place and are flexed inwardly to release the cartridge from the handle portion for replacement or cleaning without the need for tools. Any other known and effecting fastening means may be alternatively employed, or the cartridge may be permanently affixed to the handle portion and not independently replaceable.

The handle portion and lid are made of a heat resistant polymer, the base is made of a heat resistant polymer interior portion 116 and heat-resistant hard rubber outer portion 116R. The rubber out portion may be co-formed around the interior portion or may be a distinct component which fits over and around it. The pouch is made of a soft but abrasive and heat-resistant Kevlar fabric which is highly heat resistant. While the pouch is depicted as having a bag shape in FIG. 2, that is just for clarity. It is originally formed in a bag shape but then fully and permanently sewn around the base. The lid is fastened to the pouched base by screws 124 or any other suitable fastening means. The cartridge is machine washable.

The scraping blade is insert-molded with the handle portion, but it may be fastened to it, by screws or such, and could then be removable and replaceable. It is also anticipated and considered within the invention that the brush could be packaged with several such replaceable blades each having a differently contoured scraping surface to enable mating with a variety of grill spacings.

Figure 7:
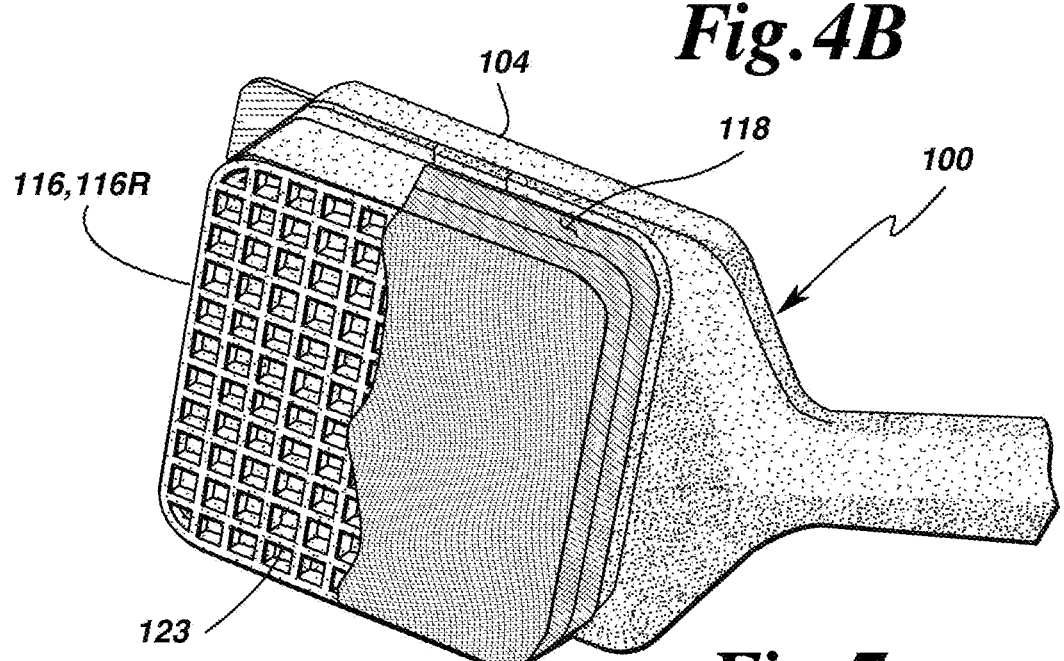
FIG. 7 is a partial view of the tool of FIG. 1.

Referring to FIGS. 4A and 7, the bottom side of the base's rubber portion has a waffle-shape of firm but flexible rubber ribs 123, which improves conformation with the cooking surface. While these ribs are shown having a criss-crossed grid pattern, they could also be almost of any different but equivalently performing pattern, or an array of firm but flexible rubber fingers 125 as shown in the alternate base 116B of FIG. 4B, all of which are considered within the invention.

The base's interior portion includes reservoir portions 126, each having a small through-hole 128 in its bottom. The Kevlar fabric of the pouch is porous.

Figure 6A:
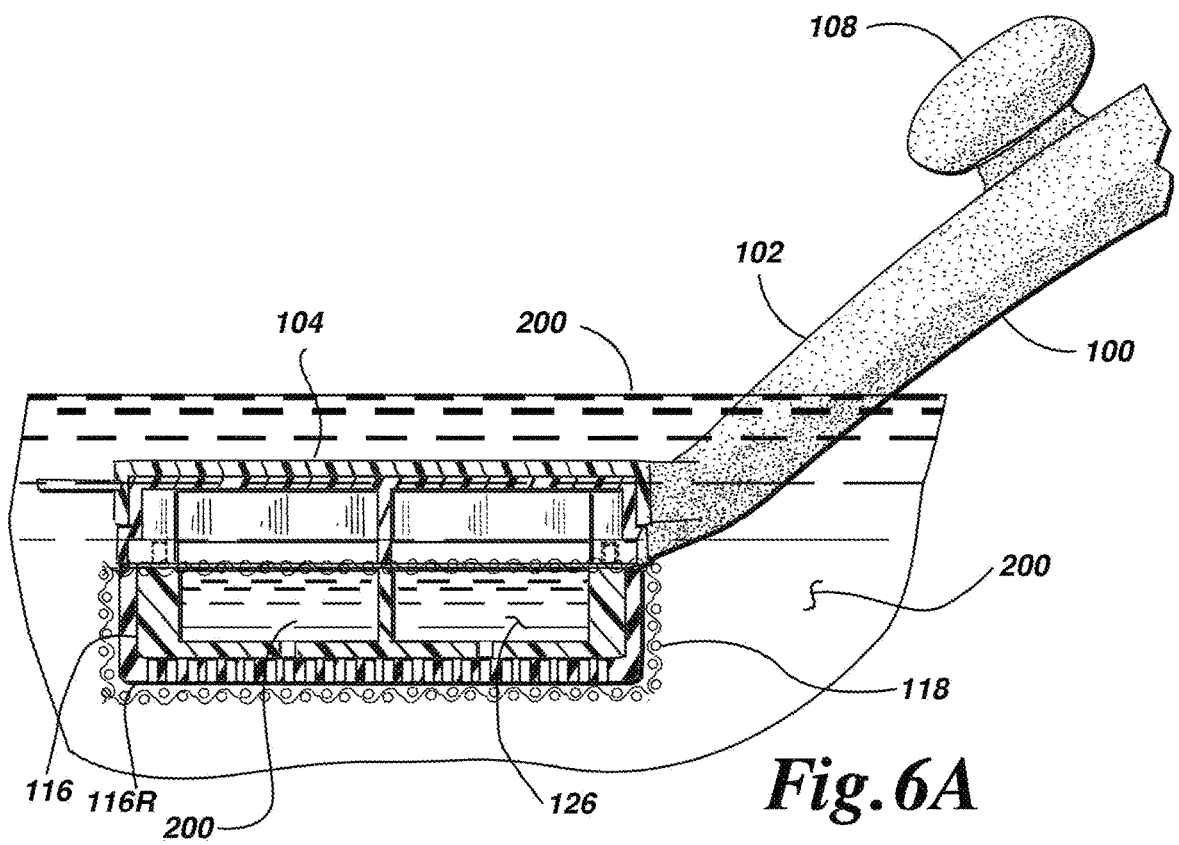
FIG. 6A is a cross-section of the tool of FIG. 1 taken at line 6A-6A of FIG. 1 during immersion to fill the cleaning head with water or cleaning solution.
Figure 6B:
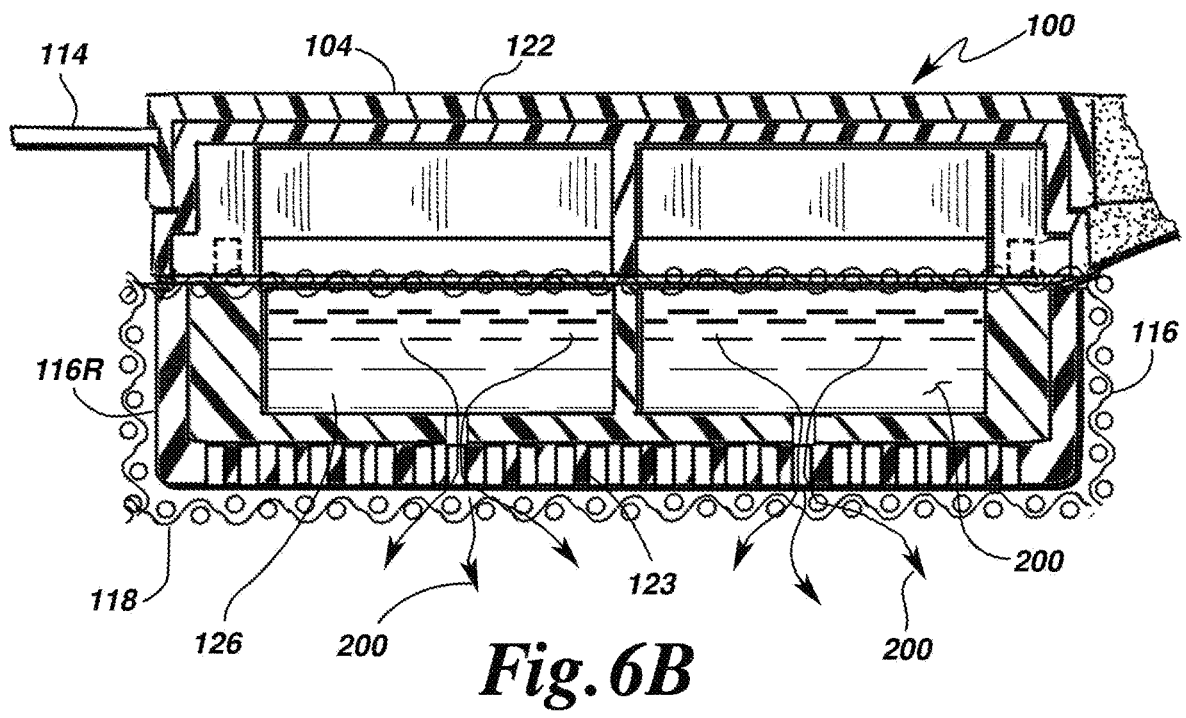
FIG. 6B is a cross-section of the tool of FIG. 1 taken at line 6A-6A of FIG. 1 during cleaning of a cooking surface.

Referring to FIG. 6A, the porosity of the pouch allows water or cleaning solution 200 to seep therethrough and into the reservoirs when the head is submerged into it, and allows air contained in the reservoirs to seep out. The reservoirs quickly become filled with the water or cleaning solution Referring to FIG. 6B, the water or cleaning solution contained in the reservoirs is allowed to slowly seep through the through-holes and voids in the rubber portion to wet the bottom side of the pouch during cleaning of cooking surface of a grill or griddle.

The arrangement of the grasp and knob relative to the head portion enhance the ability of the user to force the head portion against the cooking surface. The rubber base thus presses the damp and abrasive pouch forcefully against the cooking surface during a scrubbing motion and because the moisture seeping from the cartridge is applied directly to the residue on the cooking surface at exactly the points in time and location that the scrubbing is taking place, the moisture is allowed to evaporate until the head portion has passed. This arrangement is found to be far more effective and easier to use than any prior art grill or griddle cleaning tool.

Various changes in form and detail may be made without departing from the spirit and scope of the invention, so the invention should therefore only be considered according to the following claims, including all equivalent interpretation to which they are entitled.

I claim:

1. A utensil for cleaning a cooking surface comprising:
a cleaning head affixed to a distal end of an elongate handle; wherein the head comprises a base and a porous cover;
wherein the porous cover completely surrounds the base, such that the porous cover has a first layer between the head and the base, and a second layer configured to be in contact with the cooking surface;
wherein the base comprises a chamber; wherein
the chamber comprises a perforation through or adjacent a bottom thereof under which is disposed the first layer of the porous cover, so that the chamber is in fluid communication with the first layer; wherein
submerging the head in a liquid enables the liquid to flow through the layer and the perforation and into the chamber; wherein
applying the head having the liquid-filled chamber against the cooking surface enables the liquid flowing from the chambers and through the perforations to continuously dampen the cooking surface; and wherein
the base is comprised of a heat-resistant polymer interior portion and a heat-resistant hard rubber outer portion.

2. The utensil of claim 1 wherein the porous cover is comprised of aramid fiber.

3. The utensil of claim 2 wherein the elongate handle is comprised of a rigid and heat-resistant material.

4. The utensil of claim 3 wherein the head is removable from the handle for replacement or cleaning.

5. The utensil of claim 4 wherein the head is machine washable.

6. The utensil of claim 5 wherein the handle comprises an elongate grasp at its proximal end and a knob midway between its proximal and distal ends.

7. The utensil of claim 6 wherein the head further comprises a lid having means to temporarily affix the head to the distal end of the handle.

8. The utensil of claim 7 wherein the means to temporarily affix the head to the distal end of the handle allow removal and replacement of the head without the use of tools.

9. The utensil of claim 8 further comprising a metal scraping blade protruding from the distal end.

10. The utensil of claim 9 wherein the base further comprises one from the group including integrally-formed rubber ribs and integrally formed rubber fingers, disposed against the second layer of the porous cover and adapted to enable conformity of the second layer with the cooking surface.

11. A utensil for cleaning a cooking surface comprising:
a cleaning head affixed to a distal end of an elongate handle; wherein the head comprises a base and a porous cover;
wherein the porous cover completely surrounds the base, such that the porous cover has a first layer between the head and the base, and a second layer configured to be in contact with the cooking surface;
wherein the base comprises a plurality of chambers; wherein each chamber comprises a perforation through or adjacent a bottom thereof under which is disposed the first layer of the porous cover, so that the chamber is in fluid communication with the first layer; wherein
submerging the head in a liquid enables the liquid to flowthrough the layer and the perforations and into the chambers; wherein applying the head having the liquid-filled chamber against the cooking surface enables the liquid flowing from the chambers and through the perforations to continuously dampen the cooking surface; and wherein the base is comprised of a heat-resistant polymer interior portion and a heat-resistant hard rubber outer portion.

12. The utensil of claim 11 wherein the porous cover is comprised of aramid fiber.

13. The utensil of claim 12 wherein the elongate handle is comprised of a rigid and heat-resistant material.

14. The utensil of claim 13 wherein the head is removable from the handle for replacement or cleaning.

15. The utensil of claim 14 wherein the head is machine washable.

16. The utensil of claim 15 wherein the handle comprises an elongate grasp at its proximal end and a knob midway between its proximal and distal ends.

17. The utensil of claim 16 wherein the head further comprises a lid having means to temporarily affix the head to the distal end of the handle.

18. The utensil of claim 17 wherein the means to temporarily affix the head to the distal end of the handle allow removal and replacement of the head without the use of tools.

19. The utensil of claim 18 further comprising a metal scraping blade protruding from the distal end.

20. The utensil of claim 19 wherein the base further comprises one from the group including integrally-formed rubber ribs and integrally formed rubber fingers, disposed against the second layer of the porous cover and adapted to enable conformity of the second layer with the cooking surface.

\* \* \* \* \*